(12) United States Patent
Lee

(10) Patent No.: US 7,979,530 B1
(45) Date of Patent: Jul. 12, 2011

(54) INVENTORY LIFE CYCLE MANAGEMENT FOR A COMPUTER NETWORK

(75) Inventor: Roy K. Lee, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1166 days.

(21) Appl. No.: 11/115,622

(22) Filed: Apr. 27, 2005

(51) Int. Cl.
*G06F 15/173* (2006.01)

(52) U.S. Cl. ...................... 709/224; 709/223

(58) Field of Classification Search ............ 709/224, 709/223
See application file for complete search history.

(56) References Cited

U.S. PATENT DOCUMENTS

| | | | |
|---|---|---|---|
| 6,983,317 B1 * | 1/2006 | Bishop et al. ............... | 709/223 |
| 7,103,874 B2 * | 9/2006 | McCollum et al. .......... | 709/224 |
| 7,421,493 B1 * | 9/2008 | Adams ........................ | 709/224 |
| 2004/0019676 A1 * | 1/2004 | Iwatsuki et al. ............. | 709/224 |
| 2004/0059802 A1 * | 3/2004 | Jacquemot et al. .......... | 709/220 |
| 2005/0027846 A1 * | 2/2005 | Wolfe et al. ................. | 709/223 |

* cited by examiner

*Primary Examiner* — Larry Donaghue
*Assistant Examiner* — Nicholas Taylor
(74) *Attorney, Agent, or Firm* — Shumaker & Sieffert, P.A.

(57) ABSTRACT

An inventory management system (IMS) is described herein that captures historical data for network elements of a computer network. The IMS maintains the historical data to provide a life cycle view of the elements as utilized within the computer network. For example, the IMS may include a network scan module that receives current inventory information from at least one of the network devices, wherein the current inventory information lists elements currently deployed within network device. An event generator compares the current inventory information with the stored inventory information. A database manager updates the database to store historical data for the network devices based on the comparison.

20 Claims, 8 Drawing Sheets

Report Result

Data Source: Inventory
Report: All
*Complete Inventory Events*

- Sort
- Advanced Query
- Configure Column
- Reset
- Save

View Report In:
- PDF
- Excel

[Start New Report] [Open Saved Reports]

Showing Records 1 to 6 of 6

*You have configured the following query: (edit)*
Device = "router8" and Type = "DELETE" and Time = "Tue Jun 01 10:03:34 PDT 2004"

| Device | Type | Item | Description | Event Details | Serial Number | Time |
|---|---|---|---|---|---|---|
| router8 | DELETE | SPMB | | Item was deleted from router8 at Chassis ID:scc-re0, Module:SPMB 0 | HS2140 | Tue Jun 01 10:03:34 PDT 2004 |
| router8 | DELETE | SPMB | | Item was deleted from router8 at Chassis ID:scc-re0, Module:SPMB 1 | HS2183 | Tue Jun 01 10:03:34 PDT 2004 |
| router8 | DELETE | SIB | SIB-L8 | Item was deleted from router8 at Chassis ID:lcc0-re0, Module:SIB 0 | HP5376 | Tue Jun 01 10:03:34 PDT 2004 |
| router8 | DELETE | Routing Engine | RE-4.0 | Item was deleted from router8 at Chassis ID:lcc0-re0, Module:Routing Engine 1 | JC9190 | Tue Jun 01 10:03:34 PDT 2004 |
| router8 | DELETE | SIB | SIB-L8 | Item was deleted from router8 at Chassis ID:lcc2-re0, Module:SIB 0 | HZ2145 | Tue Jun 01 10:03:34 PDT 2004 |

INVENTORY LIFE CYCLE MANAGEMENT FOR A COMPUTER NETWORK

TECHNICAL FIELD

The invention relates to inventory management systems and, more particularly, to inventory management for computer networks.

BACKGROUND

A computer network is a collection of interconnected computing devices that can exchange data and share resources. Example devices include routers, switches, gateways, wireless access points, servers, printers and other devices. Each computing device may have a number of internal elements. A router, for example, may have interface cards (IFCs), power supplies, a primary and a backup routing engine, a forwarding engine or other components.

Conventional inventory management systems maintain an inventory database of the current locations of all the elements in the network. Most inventory management systems for computer networks periodically reconcile the inventory database with the network. The primary objective is generally to synchronize the network with the inventory database, thereby giving a real-time view of the devices and elements deployed within the network.

It is often important for an enterprise to have an accurate view of current elements, as various departments in the enterprise may base decisions on the current inventory. In particular, an enterprise may make purchasing, deployment, or other decisions based on the current inventory. For example, a service provider, a network engineer, a network planner, accounting, or customer support may interact with the inventory management system to make these or other decisions.

SUMMARY

In general, techniques are described for inventory management of computer networks. In particular, an inventory management system (IMS) is described that provides a complete life cycle view of elements in a computer network. The IMS captures and maintains complete historical data for inventory elements, and allows the elements to be tracked according to location, time and network changes. Thus, unlike conventional inventory management systems that provide only a current view of the network, the described IMS may be used to provide a "cradle-to-grave" life cycle view for inventory elements.

The IMS makes the life cycle information available to users, such as network administrators, allowing the users to probe the historical data and make more informed decisions. For example, the IMS allows an administrator to examine the history or life cycle of a particular element, including the particular devices and periods of use for the element. For example, the administrator may access the IMS and determine the history of a particular power supply. As another example, the administrator may determine when a particular version of software was installed and on which devices.

In one embodiment, a method comprises storing inventory information associated with a plurality of network devices, and receiving current inventory information from at least one of the network devices, wherein the current inventory information represents a state of one or more elements of the network devices. The method further comprises comparing the stored inventory information with the current inventory information, maintaining historical data for the network devices based on the comparison, and updating the stored inventory information to reflect the current inventory information.

In another embodiment, a system comprises a database that stores inventory information for a plurality of network devices. The system further comprises a network scan module that receives current inventory information from at least one of the network devices, wherein the current inventory information lists elements currently deployed within the network device. An event generator compares the current inventory information with the stored inventory information. A database manager updates the database to store historical data for the network devices based on the comparison.

In another embodiment, a system comprises a plurality of network devices, wherein each of the network devices is configurable to include one or more elements. The system includes an inventory management system that maintains inventory information and historical data for the network devices. The inventory information specifies the elements deployment to the network devices, and the historical data specifies a life cycle for each of the elements.

In another embodiment, a computer-readable medium comprises instructions that cause a programmable processor to store inventory information associated with a plurality of network devices, and receive current inventory information from at least one of the network devices. The current inventory information represents a state of one or more elements of the network devices. The instructions further cause the programmable processor to compare the stored inventory information with the current inventory information, generate an event upon detecting differences between the current inventory information and the stored inventory information, maintain historical data for the network devices based on the events, and update the stored inventory information to reflect the current inventory information.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 6-8 are exemplary reports generated by the IMS as viewed on a user interface.

DETAILED DESCRIPTION

Figure 1:
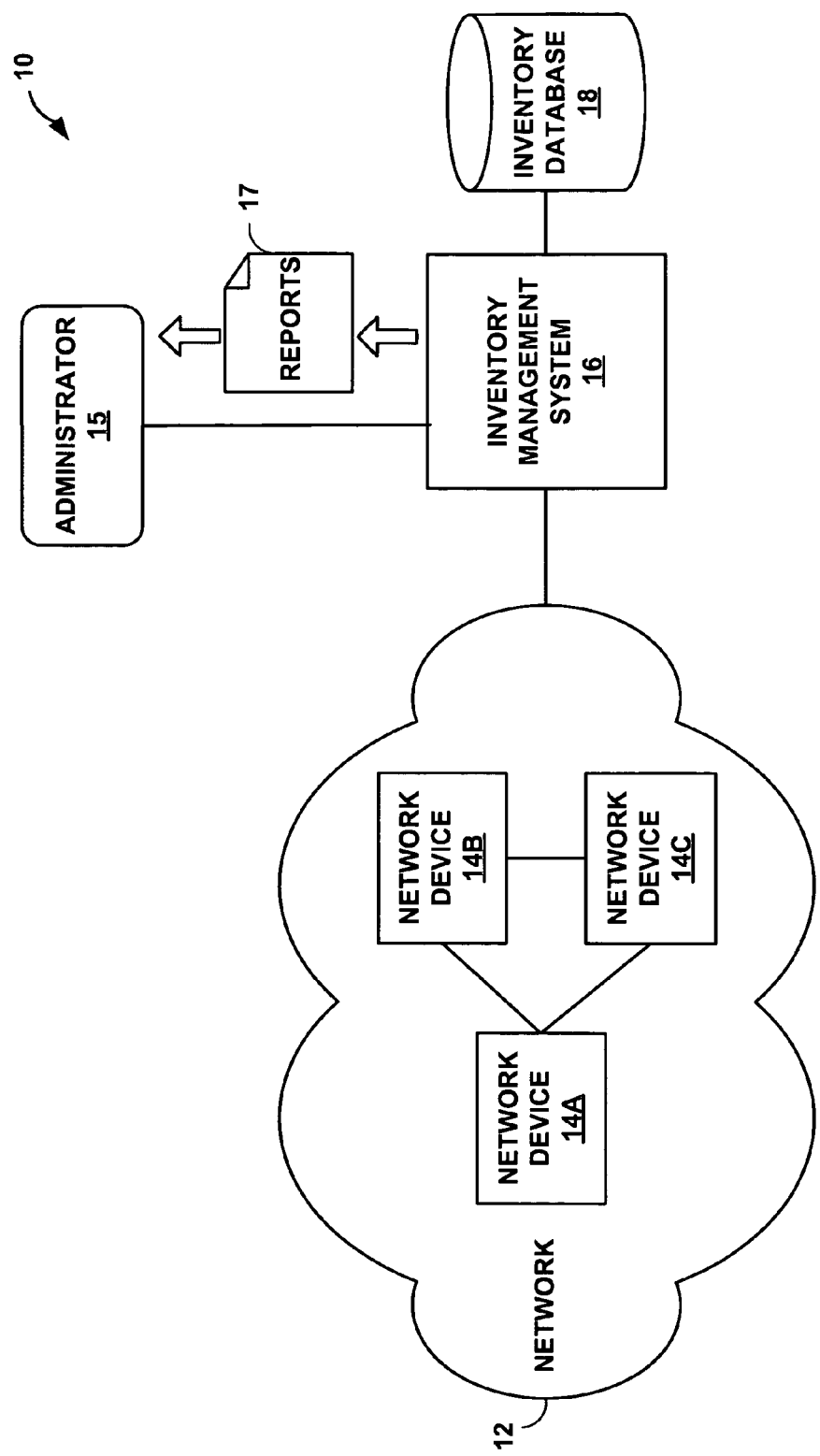
FIG. 1 is a block diagram illustrating an exemplary computer network in which an inventory management system (IMS) provides inventory management services.

FIG. 1 is a block diagram illustrating an exemplary network 12 in which an inventory management system (IMS) 16 provides inventory management services for network 12. Network devices 14A-14C ("network devices 14") may be any type of device capable of being deployed within a computer network. Examples of network devices 14 include routers, switches, gateways, wireless access points, servers, printers and other devices. Each of network devices 14 includes a number of internal elements, which may be software, hardware or licensing items. A router, for example, may have software applications, interface cards (IFCs), chassis, fans, back-planes, mid-planes, power supplies, primary and backup routing engines, a forwarding engine or other components. The elements are generally referred to herein as "inventory elements" for network 12.

IMS 16 provides administrator 15 with a life cycle view of the elements within network devices 14 of network 12. IMS 16 tracks the configuration of network devices 14 and maintains current as well as historical data within inventory database 18.

In one embodiment, each of network devices 14 has an interface by which administrator 15 enters configuration information, such as a version of a software application, licensing information, serial and part numbers of hardware items within the network device. For example, this may be done by a command line interface (CLI) by which administrator 15 enters commands for configuring devices. In the example of a router, administrator 15 may interact with a management daemon (MGD) in one of network devices 14 that presents the CLI. In turn, the MGD interacts with one or more configuration modules in the network device, such as a chassis configuration module (CCM) or a device configuration module, to configure the router.

In general, IMS 16 scans network devices 14 of network 12 either in real-time on demand or in accordance with a schedule. In one embodiment, IMS 16 scans network 12 by sending a request for configuration information to each of network devices 14 via an application programming interface (API) of IMS 16 provided by an operating system executing on the device. In the example of routers, IMS 16 issues requests to the routers via the API. In response, the MGD of each router communicates with the configuration modules, such as the CCM, to retrieve the current configuration information and send the information back to IMS 16.

A user, such as an administrator 15, may configure IMS 16 to scan at a particular frequency. For example, IMS 16 can perform inventory scanning as part of a scheduled operation, or in response to an ad hoc command from administrator 15. Administrator 15 may also configure a range of the scan, i.e., may select a subset of network devices 14 for scanning. Although shown in FIG. 1 with a single administrator 15, IMS 16 may be accessed by multiple administrators or other users.

IMS 16 receives the current configuration for each of network devices 14 and generates inventory records that represent the current state of all the elements in network 12. IMS 16 then compares the inventory records with the existing inventory records stored in inventory database 18. When IMS 16 identifies a difference in the current inventory records compared to the stored inventory records, IMS 16 generates one or more events. For example, IMS 16 may generate a Create event upon detecting a new inventory element not previously deployed within any of the existing network devices in network 12. As another example, IMS 16 may generate an Add event upon detecting the addition of an inventory element that was previously deployed within network 12 to one of network devices 14. Thus, a Create event is generated once for each inventory element the first time it is seen in network 12, and may be viewed as a "birthdate" for the inventory element, whereas an Add event occurs any time an inventory element has moved from one location to another within network 12, signaling a change of "home address" for the inventory element. Other examples include Delete, Update, and Unknown events. In particular, when an inventory element undergoes a change in spatial attribute, such as device, slot number, or port number, an Add event is generated for the new location, and a Delete event is generated for the inventory element's corresponding old location. In contrast, when an inventory element undergoes a change in a non-spatial attribute, such as its version or description, an Update event is generated. An Unknown event may indicate IMS 16 is unable to store an inventory element due to missing information, e.g., a serial number or licensed feature name. Other event types may also exist, such as Error events, Shipping events, and Surplus events. Some of these events may, for example, be manually generated by Administrator 15.

When a new network device 14 is added to network 12, administrator 15 typically accesses and configures the network device. During the next network scan, IMS 16 polls the new network device for its configuration information. As a result, IMS 16 may generate Create events for each element of the new network device that was not previously utilized within network 12. If administrator 15 removes one of network devices 14 from network 12, IMS 16 recognizes both the network device and the elements of the removed network device as deleted. That is, when IMS 16 next polls network 12 and fails to find the removed one of network devices 14, IMS 16 generates a Delete event for the removed network device and for each element that was previously used within the removed network device. In another embodiment, IMS 16 may receive event-driven notifications from network devices 14 indicating change to the current inventory elements.

Moreover, IMS 16 may categorize the elements by type. For example, the elements may include inventory elements such as hardware items, software items, licensing items, or others. Hardware items may include routing engines, fans, mid-planes, back-planes, power supplies, interface cards, and other items that IMS 16 may uniquely identify by a serial number and a part number. IMS 16 may uniquely identify software items by a version of the software running on a routing engine, and licensing items by a feature that the licensing item is for and a device associated with the licensing item.

IMS 16 records the events to inventory database 18. This log of events is accessible to administrator 15. For example, administrator 15 may view the event history for the entire network 12, or may filter these event history entries based on a set of predefined criteria, e.g., by time period, device or event type. In response to a query from administrator 15, IMS 16 generates one or more reports 17. Further, administrator 15 may select predefined reports, or create customized reports. Administrator 15 may choose to view all hardware items and sort by name, part number, or description, or search the hardware items by name, part number, or serial number. Administrator 15 may view all software items and sort by version, or search software packages by name or device. Similarly, administrator 15 may view all license items and sort or search the license items by name or device. In this manner, administrator 15 may view reports 17 detailing the current inventory of network 12 or a life cycle view for one or more inventory elements.

For example, administrator 15 may use reports 17 to detail the total inventory of network 12, display summaries by device model, or reveal where particular items are or have been installed in network 12. IMS 16 saves reports 17 within inventory database 18. Administrator 15 may view reports 17 by a web-based application, e.g., a web browser, in the hypertext markup language (HTML) format. Administrator 15 may direct IMS 16 to export reports 17 to higher layer inventory applications in a variety of formats. For example, IMS 16 may export reports 17 in the portable document format (PDF), a data description format such as the extensible markup language (XML), or a spreadsheet format.

Figure 2:
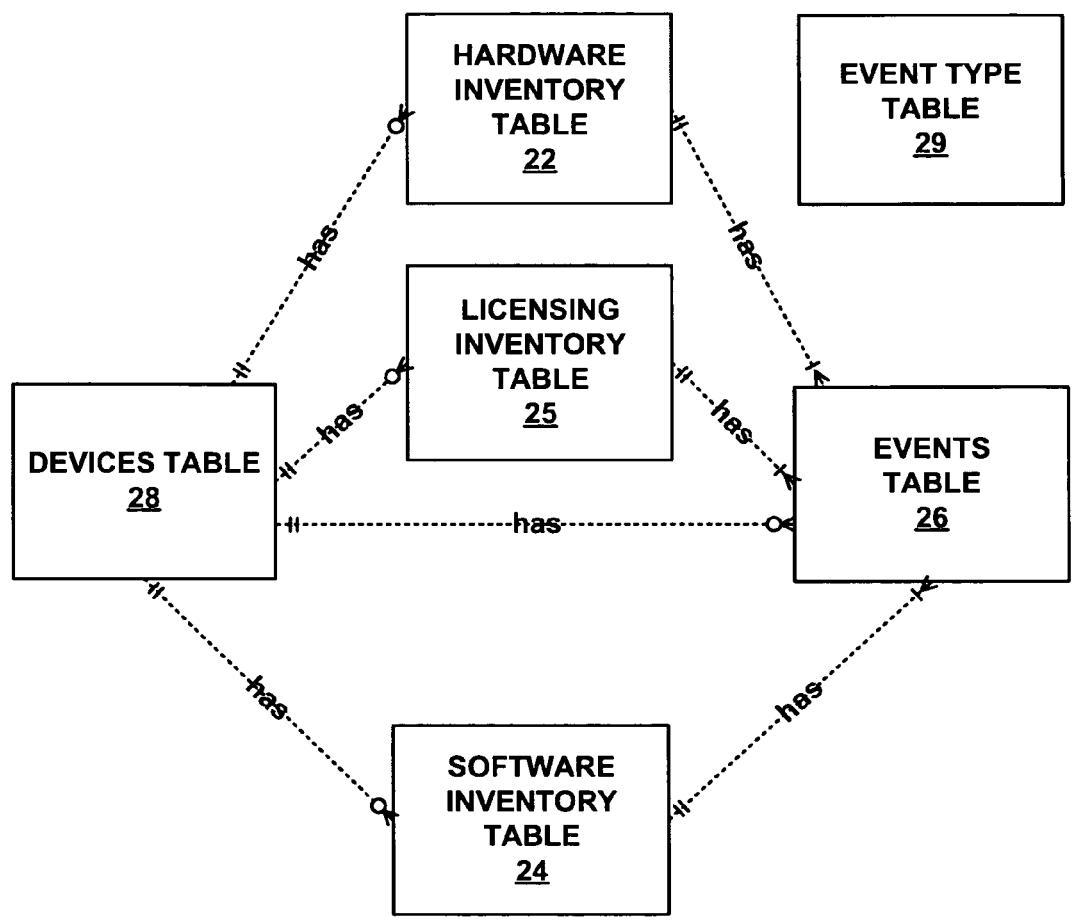
FIG. 2 illustrates an example schema for a relational database maintained by the IMS of FIG. 1.

FIG. 2 illustrates an example inventory database entity relationship diagram for inventory database 18. In this example, the entity relationship diagram shows relationships among a plurality of database tables. In particular, the entity relationship diagram includes hardware inventory table 22, software inventory table 24, licensing inventory table 25, events table 26, devices table 28 and event type table 29.

Hardware inventory table 22 stores data identifying hardware items (elements), such as routing engines, fans, backplanes, mid-planes, chassis, power supplies, or interface cards that may be utilized within network devices 14 of network 12. Hardware inventory table 22 includes a plurality of rows and columns, as is typical in relational databases. Each row may associate a hardware item with a location in the network, i.e., with a particular one of network devices 14 as listed in devices table 28. Thus, each of network devices 14 may be associated with zero or more hardware items, and each hardware item may be associated with a single network device.

In some instances, the hardware item may further be associated with a particular slot or port in the network device. In one embodiment, each row stores a unique identifier for the respective hardware item, for example, a serial number and a part number of the hardware item, and a unique identifier associated with the particular network device. In this manner, the hardware item identifier and network device identifier within the row associate the hardware item with a particular location in the network. Hardware inventory table 22 may further define a chassis identifier, a version, a name and description, a date the hardware item was created, a date the hardware item was deleted, the last time the hardware item was scanned, and the last time the hardware item was modified. IMS 16 may periodically update hardware inventory table 22 based on the current locations of the various elements in the network, thus presenting a current view of the locations of all hardware items in the network.

Similarly, software inventory table 24 stores data identifying locations of software items in network 12. Each row may associate a software item with a particular one of network devices 14 in network 12. In one embodiment, each row stores a unique identifier for the respective software item, for example, a version of the software, and a unique identifier associated with the particular network device. In this manner, the software item identifier and network device identifier within the row associate the software item with a particular location in the network. For each software item, software inventory table 24 may further define a version, a date the software item was created, a date the software item was deleted, the last time the software item was scanned, and the last time the software item was modified. IMS 16 may periodically update software inventory table 24 based on the current locations of the various software elements in the network, thus presenting a current view of the locations of all software items in the network.

Licensing inventory table 25 stores data that identifies locations of licensing features installed on network devices 14 in network 12. Each row may associate a licensing item with a particular network device in the network. Further, in one embodiment, each row stores a unique identifier for the respective licensing item, a feature name, a number of licenses used, a number of licenses installed, a number of licenses needed, a date the licensing item was created within database 18, and a date the licensing item was deleted.

Events table 26 stores data identifying a log of events that have occurred in a network. Each event is associated with an event type, such as Create, Add, Update, and Delete, that is defined within event type table 29. In one embodiment, each row of events table 26 associates an event with the unique identifier for a specific inventory element and a date and time of the event. In this manner, events table 26 may list particular events for hardware, software, and licensing items. In addition, each event may be associated with a particular network device 14 listed within devices table 28. Events table 26 may be populated as IMS 16 compares current inventory records produced from a network scan with the data stored in hardware inventory table 22, software inventory table 24, and licensing inventory table 25. Upon detecting any differences, IMS 16 generates an event, and creates a row in events table 26 to record the event.

As illustrated in FIG. 2, a single inventory element in one of tables 22, 24, and 25 may be associated with one or more event entries in events table 26. For example, for a particular interface card listed in a row of hardware inventory table 22, events table 26 may have several entries including a create event, an add event, a delete event, and several update events. In this manner, events table 26 records an event history for inventory elements of network 12.

As further illustrated in FIG. 2, each device may have zero or more hardware elements, software elements, or licensing elements. Moreover, multiple inventory elements may be associated with a single device, allowing devices table 28 to convey a current view of inventory elements of network 12.

Although illustrated for purposes of example as a relational database, inventory database 18 may store data in a variety of forms including data storage files, one or more database management systems (DBMS) executing on one or more servers, or combinations thereof. The database management systems may be a relational (RDBMS), hierarchical (HDBMS), multidimensional (MDBMS), object oriented (ODBMS or OODBMS) or object relational (ORDBMS) database management systems. Inventory database 18 may store data, for example, within a single relational database such as SQL Server™ from Microsoft Corporation.

Figure 3:
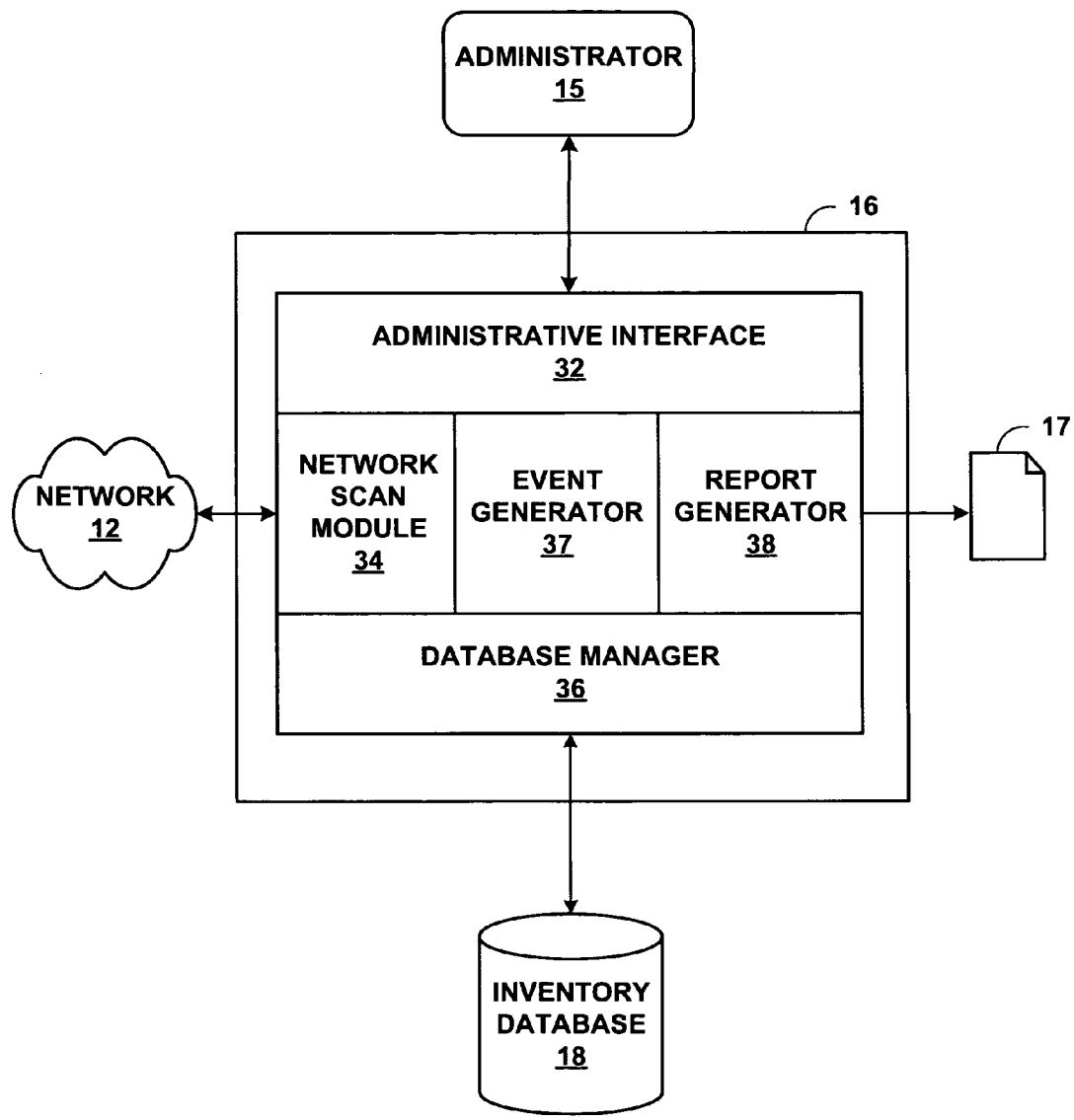
FIG. 3 is a block diagram illustrating an exemplary embodiment of the IMS in further detail.

FIG. 3 is a block diagram illustrating an exemplary embodiment of IMS 16 in further detail. In the example of FIG. 3, IMS 16 contains an administrative interface 32, a network scan module 34, a database manager 36, an event generator 37, and a report generator 38 executing within an operating environment provided by IMS 16. IMS 16 may be any general-purpose computing device coupled to network 12, such as an Ultra SPARC III™ running the SUN OS or Solaris™ 2.8 operating system from Sun Microsystems of Santa Clara, Calif.

Administrative interface 32 presents a user interface by which administrator 15 or other users interact with IMS 16. Administrator 15 may, for example, interact with administrative interface 32 to request and customize an inventory report 17 or to search inventory information stored within inventory database 18. Administrator 15 may also use administrative interface 32 to configure a frequency for network scans performed by network scan module 34. In addition, administrator 15 may use administrative interface 32 to request IMS 16 to perform an ad hoc inventory scan in addition to scheduled scans. Administrator 15 may use administrative interface 32 to configure the range of network devices in network 12 that network scan module 34 must scan.

Network scan module 34 may periodically poll network devices 14 in network 12 to obtain current information about the locations of inventory elements in network 12. For example, network scan module 34 may issue a request to each of network devices 14 requesting current configuration information. MGDs or other software agents executing on network devices 14 respond by returning the requested information. Network scan module 34 may scan network devices 14 one at a time, or may scan multiple network devices in parallel threads. In another embodiment, network scan module 34 may not poll the network, but may instead receive event-driven notifications from the network devices indicating changes in inventory elements.

Database manager 36 receives from the network devices the current information requested by network scan module 34. Database manager 36 updates the hardware, software, and licensing tables in inventory database 18 to reflect the current information.

During this process, database manager 36 compares the current information with the inventory information stored in inventory database 18. For example, for each inventory element specified by the current information, database manager 36 may search the inventory information stored within inventory database 18. If database manager 36 finds the inventory element listed in the stored inventory information, database manager 36 determines whether the inventory element is currently deployed to the same one of network devices 14 with which it is currently associated within inventory database 18.

If the inventory element is not deployed to the same one of network devices 14, or is not found at all in inventory database 18, database manager 36 directs event generator 37 to generate an appropriate event, such as an add, update, or create event. Moreover, if there are inventory elements that exist in the stored inventory information but not found within the current scan, event generator 37 may generate a delete event. Database manager 36 records any events generated by events generator 37 to the events table of inventory database 18.

Report generator 38 generates inventory reports 17 as requested by administrator 15. Administrator 15 may request customized reports from report generator 38 via administrative interface 32. For example, administrator 15 may request a report of all events that have occurred in the network during a particular time span. As another example, administrator 15 may request a report of the history of a particular inventory element, e.g., a power supply. Report generator 38 formulates and issues queries to database manager 36 to access inventory database 18 and retrieve relevant data based on criteria provided by administrator 15.

Figure 4:
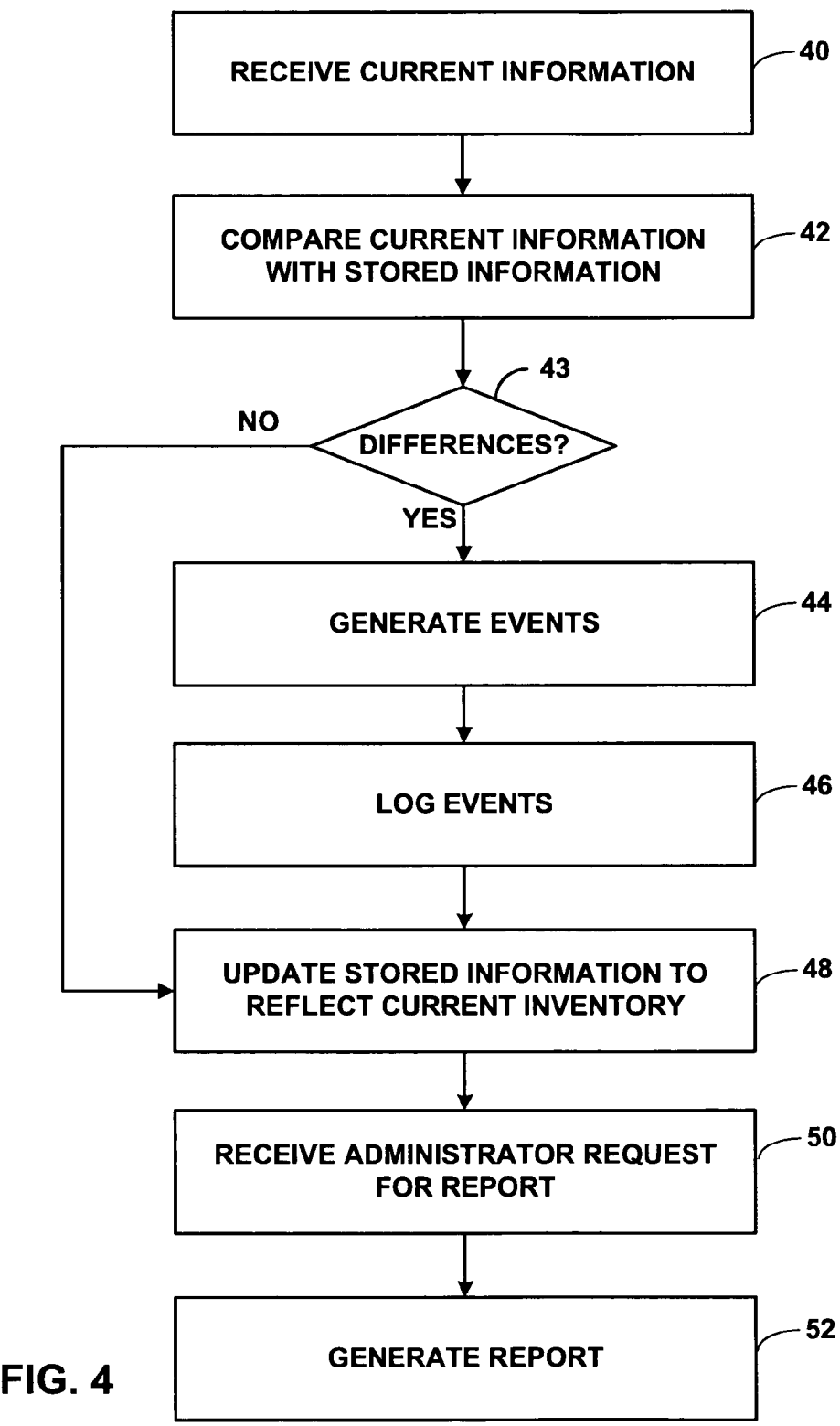
FIG. 4 is a flowchart illustrating exemplary operation of the IMS in accordance with the principles of this invention.

FIG. 4 is a flowchart illustrating exemplary operation of an IMS in accordance with the principles of this invention. For purpose of illustration, FIG. 4 will be described with reference to the components of IMS 16 of FIG. 3.

Initially, IMS 16 receives current inventory information from network devices 14 of network 12 (40). For example, network scan module 34 may initiate a network scan and poll each of network devices 14 in response to a schedule or manual request from administrator 15. In some embodiments, IMS 16 may receive the current inventory information as an event-driven notification from network devices 14.

Database manager 36 compares the current inventory information with inventory information stored in inventory database 18 (42). In the event any differences are detected (43), event generator 37 generates one or more events based on the comparison (44). Database manager 36 logs the events to events table 26 in inventory database 18 (46).

In addition, database manager 36 updates the stored inventory information in inventory database 18 to reflect the current inventory information received by network scan module 34 (48). In this manner, IMS 16 updates hardware inventory table 22, software inventory table 24, and licensing inventory table 25 to reflect the current inventory items deployed within network devices 14 of network 12.

At any point, IMS 16 may also receive a request from administrator 15 via administrative interface 32 for a report 17 (50). Administrator 15 may request one of a selection of standard reports or may customize a report. For example, administrator 15 may request a report on events generated in network 12. In response, report generator 38 outputs report 17 based on criteria provided by administrator 15 (52). In this way, administrator 15 may utilize IMS 16 to obtain a historical view of inventory items associated with network 12.

Figure 5:
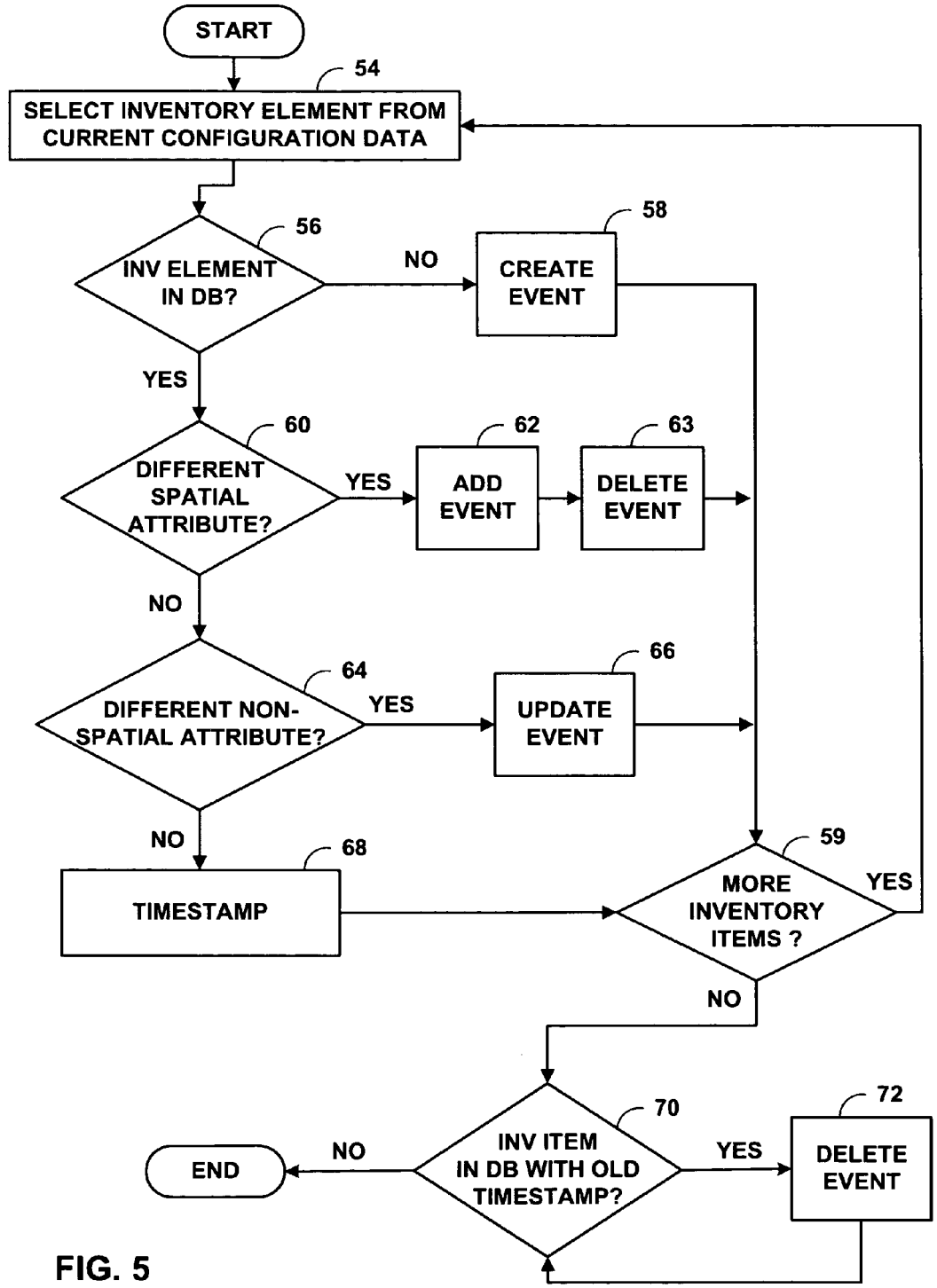
FIG. 5 is a more detailed flowchart illustrating exemplary operation of the IMS in scanning the network and recording change events.

FIG. 5 is a more detailed flowchart illustrating exemplary operation of IMS 16 when scanning network 12 and generating events (step 44 of FIG. 4). In the example of FIG. 5, IMS 16 generates create, add, update, and delete events.

In general, IMS 16 processes each inventory element identified in the current configuration information received from network devices 14. IMS 16 may analyze multiple inventory elements in a parallel process or may analyze inventory elements one after another. In any case, IMS 16 selects an inventory element listed in the current information (54), and searches inventory database 18 for the selected inventory element. For example, database manager 36 may query inventory database 18 based on a serial number, part number, or other unique attribute for the inventory element (56).

If IMS 16 does not find the selected inventory element within inventory database 18 (no branch of 56), event generator 37 generates a create event (58). This event is typical when a new inventory element is deployed for the first time within a network device 14 of network 12. Specifically, database manager 36 inserts a row in inventory database 18 for this inventory element in the correct table to which the element corresponds, i.e., hardware, software, or licensing. The row may contain a timestamp indicating the time the inventory element was created. IMS 16 also inserts a row in the events table of inventory database 18 recording the event type (create), the unique identifiers of the particular inventory element and the corresponding network device, and the date and time the event was generated. IMS 16 then repeats the process until all of the current inventory information has been processed (59).

If, however, IMS 16 does located the selected inventory element within inventory database 18 (yes branch of 56), IMS 16 performs another comparison to determine whether the stored inventory information indicates any spatial attribute of the inventory element has changed (60). One example of a change to a spatial attribute is the inventory element being moved to a different port or slot within one of network devices 14 according to the current configuration information. For instance, in the case of an interface card (a hardware element), the interface card may be moved from one slot to another within the same network device. Another example of a change to a spatial attribute is the inventory element being moved from one network device to another.

If a spatial attribute of the inventory element differs (yes branch of 60), event generator 37 generates an add event for the network device in which the inventory element is currently located according to the current information (62). This is similar to a create event, except that the add event indicates that the inventory element has previously been deployed within network 12 and, therefore, inventory records already exists inventory database 18. IMS 16 inserts a row in the events table recording the add event, the unique identifiers of the inventory element and the network device, and the date and time of the event. IMS 16 also updates the row in hardware inventory table 22 in inventory database 18 to reflect the new location of the inventory element in network 12 and updates the corresponding timestamp. In addition, event generator 37 generates a delete event for the network device with which the inventory element was previously associated (63). IMS 16 again repeats the process until all of the current inventory information has been processed (59).

Alternatively, if the inventory element currently being processed has no change in spatial attributes (no branch of 60), event generator 37 determines whether any non-spatial attributes in the inventory element are different from the current information to the stored information (64). One example of a change in a non-spatial attribute is that an installed software application may have been upgraded to a new version.

If event generator 37 detects a change in a non-spatial attribute (yes branch of 64), the event generator generates an update event (66). IMS 16 inserts a row in the events table recording the update event, the unique identifiers of the inventory element and the network device and the date and time of the event. IMS 16 also updates the row in the hardware table in inventory database 18 to reflect the modified non-spatial attribute for the inventory element and updates the corresponding timestamp. IMS 16 then repeats the process until all of the current inventory information has been processed (59).

Alternatively, if neither the spatial nor the non-spatial attributes of the inventory element have changed (no branch of 64) (i.e., no differences are found between the stored inventory information and the current inventory information), database manger 36 updates the timestamp in the row for that inventory element in inventory database 18 to reflect the current scan time (68). IMS 16 then repeats the process until all of the current inventory information has been processed (59).

Once all current configuration data has been processed and there are no more inventory elements to be checked (no branch of 59), database manager 36 searches inventory database 18 for any entries with old timestamps (70). These entries indicate inventory elements that formerly were present in the stored information, but which are not present in the current information. Event generator 37 recognizes these elements as no longer present in network 12, and generates a delete event (72). Database manager 36 inserts a row in the events table recording the delete event, the unique identifiers of the inventory element, and the date and time of the event. IMS 16 also updates the row in the corresponding table in inventory database 18 to reflect the status of the inventory element as "deleted," and updates the timestamp. IMS 16 continues this process until all inventory elements with an old timestamp have been deleted (70, 72). In this manner, IMS 16 updates inventory database 18 to reflect the current state of network 12, while logging the changes in the network as events in the events table to compile a historical life cycle view of the inventory elements utilized within the network.

Figure 6:
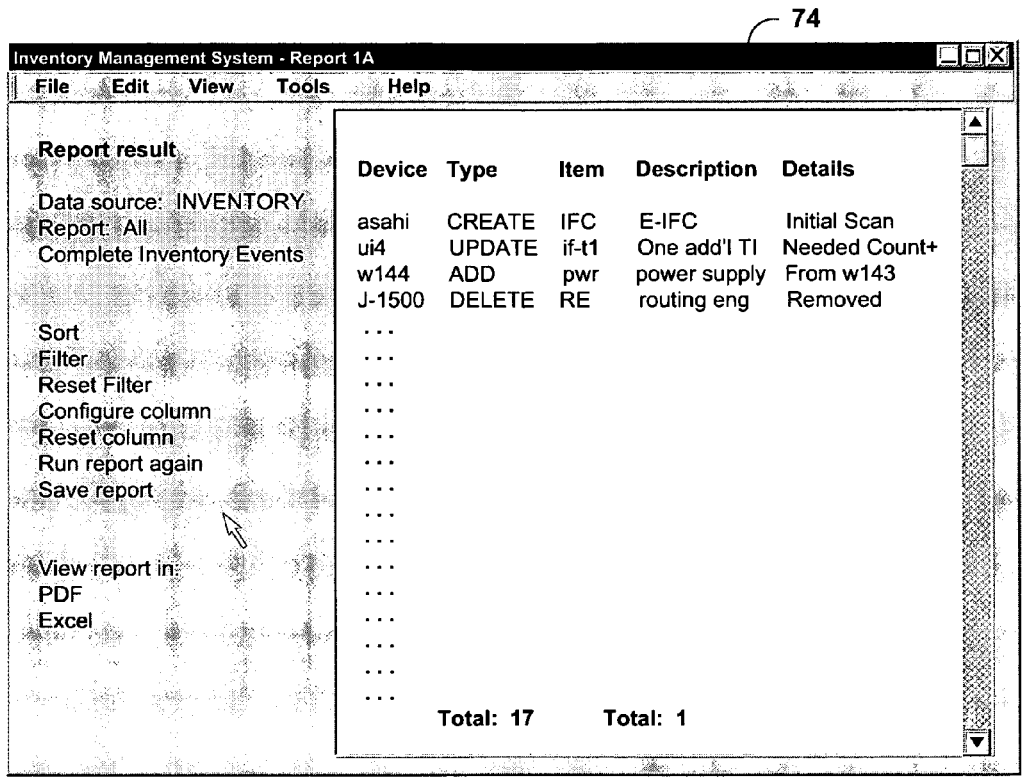

FIG. 6 is an exemplary screen illustration depicting an example inventory report 74 generated by IMS 16 as viewed on an interface, such as administrative interface 32 of FIG. 3. In particular, inventory report 74 represents a sample report in which administrator 15 has requested a list of all inventory events generated and recorded by IMS 16. Administrator 15 may use the commands on the left side of inventory report 74 to sort the report, filter the report based on one or more criteria, save the report, and so on. In this manner, administrator 15 may perform a historical analysis on the inventory elements utilized within network 12.

Figure 7:
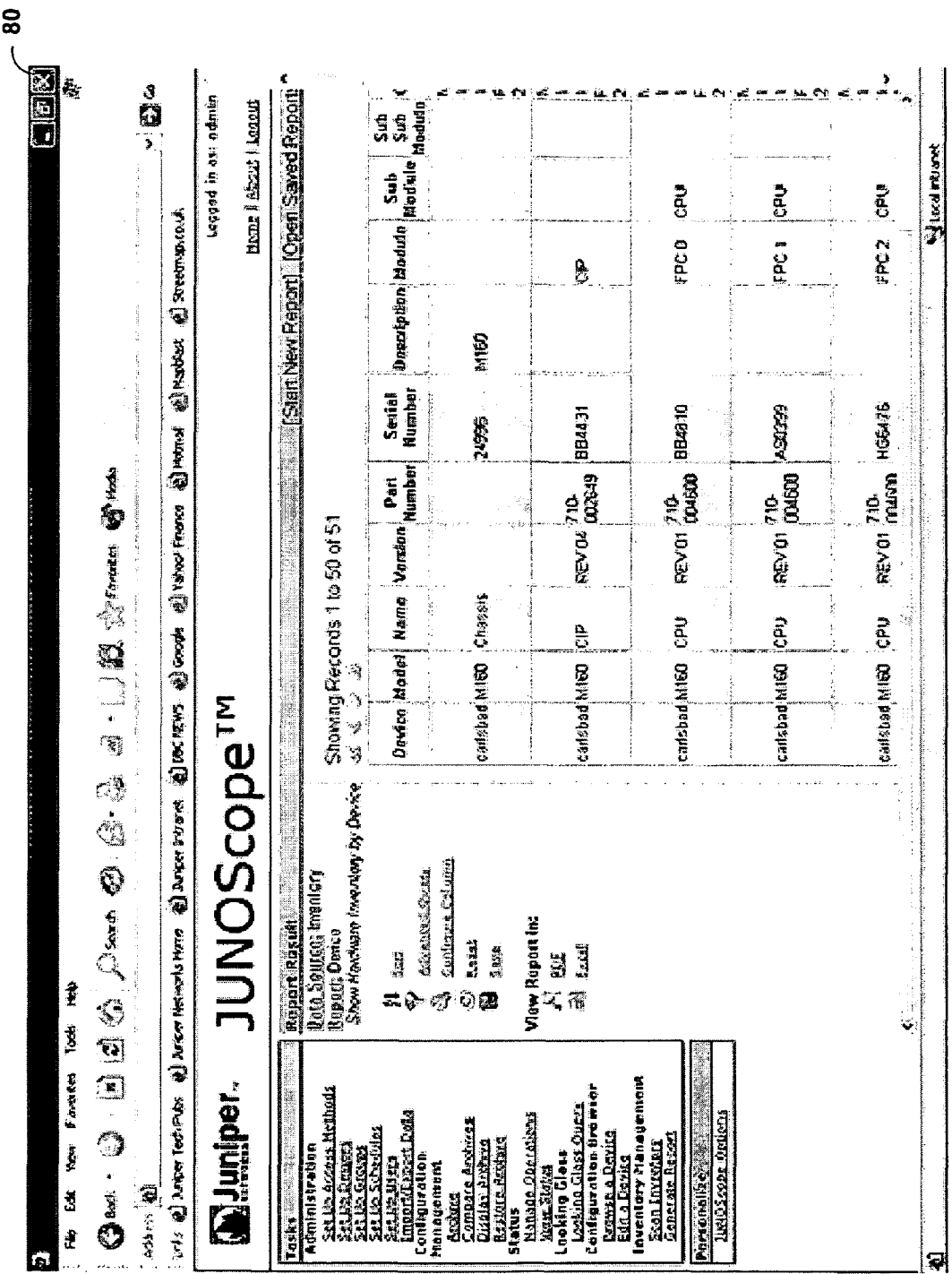

FIG. 7 is an exemplary screen illustration of a more detailed report 80 that lists current inventory elements associated with network devices 14. In this manner, administrator 15 may request an up-to-date view of network 12.

FIG. 8 is an exemplary screen illustration of a report 90 that lists all inventory elements that were removed from one of network devices 14 identified as "router8" at a time of "Tue June 01 10:03:34 PDT 2004."

Various embodiments of the invention have been described. These and other embodiments are within the scope of the following claims.

The invention claimed is:

1. A method comprising:
   storing, with an inventory management system, inventory information associated with a plurality of network devices;
   sending requests for current inventory information, with a network scan module of the inventory management system, to at least one of the network devices;
   receiving current inventory information, with the network scan module, from the at least one of the network devices in response to the request, wherein the current inventory information uniquely identifies one or more individual internal elements of the network devices across the plurality of network devices;
   comparing, with an event generator of the inventory management system, the stored inventory information with the current inventory information to detect a difference between the stored inventory information and the current inventory information, wherein the difference between the stored inventory information and the current inventory information indicates that a first individual internal element has moved from a first network device to a second network device;
   upon detecting the difference between the stored inventory information and the current inventory information during the comparison, generating, with the event generator, an add event for the second network device, and a delete event for the first network device, wherein the add event indicates an association of the first individual internal element with the second network device, and wherein the delete event indicates a termination of an association between the first individual internal element and the first network device; and
   updating the stored inventory information to reflect the current inventory information while maintaining the previously stored inventory information as historical data, wherein the historical data comprises a sequence of the events for the first individual internal element, and wherein the sequence of the events comprises entries associated with one or more network devices over a period of time.

2. The method of claim 1, wherein updating the stored inventory information comprises:
   updating an event log to record the add event and the delete event generated based on the comparison,
   wherein the historical data includes the stored inventory information and the event log.

3. The method of claim 1, further comprising:
   generating an add event for a new location and a corresponding delete event for an old location when the comparison identifies an individual internal element associated with a different spatial attribute in the current information than in the stored inventory information.

4. The method of claim 1, further comprising sending the requests in accordance with a configurable frequency.

5. The method of claim 1, wherein receiving current inventory information that uniquely identifies the one or more individual internal elements of the network devices comprises receiving current inventory information that uniquely identifies one or more of hardware items deployed on the network devices, software items deployed on the network devices, or licensing items deployed on the network devices.

6. The method of claim 1, further comprising updating a timestamp associated with the stored inventory information, wherein the timestamp indicates the most recent update of the stored inventory information.

7. The method of claim 1, further comprising executing a query to generate a report that indicates a sequence of events for one or more of the individual internal elements of the network devices over a period of time.

8. A system comprising:
a programmable processor;
a database that stores inventory information for a plurality of network devices;
a network scan module executable by the programmable processor to send requests for current inventory information to at least one of the network devices and receives current inventory information from the at least one of the network devices in response to the requests, wherein the current inventory information uniquely identifies one or more individual internal elements of the network device across the plurality of network devices;
an event generator that compares the current inventory information with the stored inventory information to detect a difference between the stored inventory information and the current inventory information, wherein the difference between the stored inventory information and the current inventory information indicates that a first individual internal element has moved from a first network device to a second network device,
wherein, upon detecting the different, the event generator generates an add event for the second network device, and a delete event for the first network device, wherein the add event indicates an association of the first individual internal element with the second network device, and wherein the delete event indicates a termination of an association between the first individual internal element and the first network device; and
a database manager that, upon detecting the difference between the stored inventory information and the current inventory information during the comparison, updates the stored inventory information to reflect the current inventory information while maintaining the previously stored inventory information as historical data, wherein the historical data comprises a sequence of the events for the first individual internal element, and wherein the sequence of the events comprises entries associated with one or more network devices over a period of time.

9. The system of claim 8,
wherein the database manager maintains the historical data by updating an event log within the database to record the add event and the delete event generated based on the comparison, and
wherein the historical data includes the stored inventory information and the event log.

10. The system of claim 8, further comprising a report generator to access the historical data from the database and generate a report to indicate a set of the events associated with one or more of the individual internal elements of the network devices over a period of time.

11. The system of claim 8, wherein the current inventory information that uniquely identifies one or more individual internal elements of the network devices received by the network scan module comprises current inventory information that uniquely identifies one or more of hardware items deployed on the network devices, software items deployed on the network devices, or licensing items deployed on the network devices.

12. A non-transitory computer-readable medium comprising instructions for causing a programmable processor to:
store inventory information associated with a plurality of network devices;
send a request for current inventory information to at least one of the network devices;
receive current inventory information from the at least one of the network devices in response to the requests, wherein the current inventory information uniquely identifies one or more individual internal elements of the network devices across the plurality of network devices;
compare the stored inventory information with the current inventory information to detect a difference between the stored inventory information and the current inventory information, wherein the difference between the stored inventory information and the current inventory information indicates that a first individual internal element has moved from a first network device to a second network device;
generate an add event for the second network device, and a delete event for the first network device upon detecting the difference between the current inventory information and the stored inventory information during the comparison, wherein the add event indicates an association of the first individual internal element with the second network device, and wherein the delete event indicates a termination of an association between the first individual internal element and the first network device;
update an event log to record the generated event; and
update the stored inventory information to reflect the current inventory information, while maintaining the previously stored inventory information as historical data, wherein the historical data includes the stored inventory information and the event log, and
wherein the event log comprises a sequence of the events for the first individual internal element, and wherein the sequence of the events comprises entries associated with one or more network devices over a period of time.

13. The non-transitory computer-readable medium of claim 12, wherein the instructions further comprise instructions for causing the processor to:
generate an add event for a new location and a corresponding delete event for an old location when detecting an individual internal element associated with a different spatial attribute in the current inventory information than in the stored information.

14. The method of claim 1, further comprising
executing a query to generate a report that indicates the sequence of the events for the first individual internal element that includes entries associated with one or more network devices over a period of time, wherein the events are generated based on the comparison between the stored inventory information and the current inventory information.

15. The system of claim 8, further comprising a report generator to access the historical data from the database and generate a report to indicate the sequence of the events for the first individual internal element that includes entries associated with one or more network devices over a period of time, wherein the events are generated based on the comparison between the stored inventory information and the current inventory information.

16. The non-transitory computer-readable medium of claim 12, further comprising instructions for causing a programmable processor to execute a query to generate a report that indicates the sequence of the events for the first individual internal element that includes entries associated with one or more network devices over a period of time, wherein the events are generated based on the detecting differences between the current inventory information and the stored inventory information.

17. A method comprising:

storing, with an inventory management system, inventory information associated with a plurality of network devices;

sending requests for current inventory information, with a network scan module of the inventory management system, to at least one of the network devices;

receiving current inventory information, with the network scan module, from the at least one of the network devices in response to the request, wherein the current inventory information uniquely identifies one or more individual elements of the network devices, and wherein the one or more individual internal elements are uniquely identified across the plurality of network devices;

comparing, with an event generator of the inventory management system, the stored inventory information with the current inventory information to detect a difference between the stored inventory information and the current inventory information;

upon detecting the difference between the stored inventory information and the current inventory information during the comparison, generating, with the event generator, one or more events based on the comparison, wherein generating the one or more events comprises one or more of:

generating a create event when the comparison identifies an individual element existing in the current information that does not exist in the stored inventory information;

generating an add event for a new location and a corresponding delete event for an old location when the comparison identifies an individual element associated with a different spatial attribute in the current inventory information than in the stored inventory information;

generating an update event when the comparison identifies an individual element associated with a different non-spatial attribute in the current information than in the stored inventory information; and generating a delete event when the comparison identifies an individual element existing in the stored inventory information that does not exist in the current information; and updating the stored inventory information to reflect the current inventory information while maintaining the previously stored inventory information as historical data, wherein the historical data comprises a sequence of events for each individual element, wherein the sequence of events comprises entries associated with one or more network devices over a period of time.

18. The method of claim 17, further comprising executing a query to generate a report that indicates a sequence of the events for one or more of the individual elements that includes entries associated with one or more network devices over a period of time.

19. The method of claim 17, wherein spatial attributes include one or more of a device associated with an individual element, a slot number associated with an individual element, and a port number associated with an individual element, and wherein non-spatial attributes include one or more of a version associated with an individual element and a description associated with an individual element.

20. The method of claim 17, wherein comparing the stored inventory information with the current inventory information comprises identifying that the individual element is associated with a first network device in the stored inventory information and that the individual element is associated with a second network device in the current inventory information, wherein generating an add event for a new location comprises generating the add event for the second network device, wherein the add event indicates the association of the individual element with the second network device, and wherein generating a corresponding delete event for an old location comprises generating the delete event for the first network device, wherein the delete event indicates a termination of the association between the individual element and the first network device.

* * * * *

UNITED STATES PATENT AND TRADEMARK OFFICE
CERTIFICATE OF CORRECTION

| | | |
|---|---|---|
| PATENT NO. | : 7,979,530 B1 | Page 1 of 1 |
| APPLICATION NO. | : 11/115622 | |
| DATED | : July 12, 2011 | |
| INVENTOR(S) | : Roy K. Lee | |

It is certified that error appears in the above-identified patent and that said Letters Patent is hereby corrected as shown below:

Column 11, line 32 (claim 8): "the different," should be -- the difference --

Signed and Sealed this
Twentieth Day of March, 2012

David J. Kappos
*Director of the United States Patent and Trademark Office*